United States Patent
Vincent et al.

(10) Patent No.: US 10,169,060 B1
(45) Date of Patent: Jan. 1, 2019

(54) OPTIMIZATION OF PACKET PROCESSING BY DELAYING A PROCESSOR FROM ENTERING AN IDLE STATE

(71) Applicant: Amazon Technologies, Inc., Seattle, WA (US)

(72) Inventors: Pradeep Vincent, Kenmore, WA (US); David D. Becker, Seattle, WA (US)

(73) Assignee: Amazon Technologies, Inc., Reno, NV (US)

(*) Notice: Subject to any disclaimer, the term of this patent is extended or adjusted under 35 U.S.C. 154(b) by 16 days.

(21) Appl. No.: 15/211,958

(22) Filed: Jul. 15, 2016

Related U.S. Application Data (62) Division of application No. 14/194,077, filed on Feb. 28, 2014, now Pat. No. 9,396,010, which is a division of application No. 13/227,256, filed on Sep. 7, 2011, now Pat. No. 8,694,994.

(51) Int. Cl.
*G06F 9/455* (2018.01)
*H04L 12/931* (2013.01)

(52) U.S. Cl.
CPC .......... *G06F 9/45533* (2013.01); *H04L 49/20* (2013.01)

(58) Field of Classification Search
None
See application file for complete search history.

(56) References Cited

U.S. PATENT DOCUMENTS

| | | | |
|---|---|---|---|
| 4,467,416 A | 8/1984 | Cushing et al. | |
| 4,698,748 A | 10/1987 | Juzswik et al. | |
| 5,790,545 A | 8/1998 | Holt et al. | |
| 6,308,241 B1 | 10/2001 | Simovich et al. | |
| 7,643,486 B2 | 1/2010 | Belz et al. | |
| 7,730,202 B1 | 6/2010 | Biederman et al. | |
| 8,095,816 B1 | 1/2012 | Chan et al. | |

(Continued)

FOREIGN PATENT DOCUMENTS

JP 2011113501 6/2011

OTHER PUBLICATIONS

U.S. Appl. No. 13/227,256, "Non-Final Office Action", dated Aug. 23, 2013, 13 pages.

(Continued)

*Primary Examiner* — Benjamin Lamont
(74) *Attorney, Agent, or Firm* — Kilpatrick Townsend & Stockton LLP (57) ABSTRACT

Some embodiments facilitate high performance packet-processing by enabling one or more processors that perform packet-processing to determine whether to enter an idle state or similar state. As network packets usually arrive or are transmitted in batches, the processors of some embodiments determine that more packets may be coming down a multi-stage pipeline upon receiving a first packet for processing. As a result, the processors may stay awake for a duration of time in anticipation of an incoming packet. Some embodiments keep track of the last packet that entered the first stage of the pipeline and compare that with a packet that the processor just processed in a pipeline stage to determine whether there may be more packets coming that need processing. In some embodiments, a processor may also look at a queue length of a queue associated with an upstream stage to determine whether more packets may be coming.

20 Claims, 6 Drawing Sheets

(56) References Cited

U.S. PATENT DOCUMENTS

| | | |
|---|---|---|
| 8,193,831 B1 | 6/2012 | Schzukin et al. |
| 8,694,994 B1 | 4/2014 | Vincent et al. |
| 9,396,010 B2 | 7/2016 | Vincent et al. |
| 2001/0005853 A1 | 6/2001 | Parkes et al. |
| 2003/0135716 A1* | 7/2003 | Vinitzky ............... G06F 9/3851 712/220 |
| 2004/0244000 A1* | 12/2004 | Frank ................. G06F 9/30047 718/1 |
| 2004/0255105 A1* | 12/2004 | Chung ................. G06F 9/3851 713/1 |
| 2007/0079307 A1* | 4/2007 | Dhawan ............ H04L 29/12584 718/1 |
| 2007/0266370 A1 | 11/2007 | Myers et al. |
| 2008/0163205 A1 | 7/2008 | Bennett et al. |
| 2009/0293055 A1* | 11/2009 | Carroll ................. G06F 9/4856 718/1 |
| 2010/0030928 A1* | 2/2010 | Conroy ................. G06F 1/3203 710/23 |
| 2010/0332755 A1* | 12/2010 | Bu ........................... G06F 9/52 711/119 |
| 2011/0063094 A1 | 3/2011 | Meiertoberens et al. |
| 2011/0080919 A1 | 4/2011 | Ding et al. |
| 2011/0179298 A1 | 7/2011 | Odaohhara |
| 2011/0321065 A1* | 12/2011 | Gopalakrishnan ...... G06F 9/545 719/328 |
| 2012/0210032 A1 | 8/2012 | Wang et al. |
| 2012/0266176 A1 | 10/2012 | Vojnovic et al. |

OTHER PUBLICATIONS

U.S. Appl. No. 13/227,256 , "Notice of Allowance", dated Dec. 11, 2013, 7 pages.

U.S. Appl. No. 14/194,077 , "Final Office Action", dated Sep. 1, 2015, 13 pages.

U.S. Appl. No. 14/194,077 , "Non-Final Office Action", dated May 7, 2015, 10 pages.

U.S. Appl. No. 14/194,077 , "Notice of Allowance", dated Apr. 1, 2016, 10 pages.

* cited by examiner

OPTIMIZATION OF PACKET PROCESSING BY DELAYING A PROCESSOR FROM ENTERING AN IDLE STATE

CROSS-REFERENCE TO RELATED APPLICATIONS

This non-provisional application is a division of U.S. Patent Application No. 14/194,077, filed on Feb. 28, 2014, now U.S. Pat. No. 9,396,010 issued on Jul. 19, 2016, which is a division of U.S. patent application Ser. No. 13/227,256, filed on Sep. 7, 2011, now U.S. Pat. No. 8,694,994 issued on Apr. 8, 2014, both entitled "Optimization of Packet Processing by Delaying a Processor from Entering an Idle State," which are incorporated herein by reference in their entireties for all purposes.

BACKGROUND

As an increasing number of applications and services are being made available over networks such as the Internet, an increasing number of content, application, and/or service providers are turning to centralized or shared resource technologies, such as cloud computing. As the amount of traffic increases, there is a need to improve the shared resources' efficiency in processing incoming data.

Existing systems and networks utilize dedicated networking resources to process incoming data packets from users. In a computing environment where resources are shared, however, there may not be dedicated resources for packet processing. Most of the shared resources in such an environment perform various activities in addition to network packet processing. For instance, a central processing unit (CPU) may perform various other activities such as running applications in addition to processing incoming packets. Hence, whenever there is no activity in the packet processing pipeline, the CPU(s) processes other tasks until the CPU(s) receives another task or an interrupt occurs requesting the CPU(s) to process incoming data packets. Unfortunately, reliance on interrupts creates high CPU overhead and lowers the efficiency of network packet processing in a cloud environment. Further, the CPU immediately works on unrelated processes after processing the packets in the queue for a pipeline stage, which leads to a delay and more work in scheduling the CPU to resume working on packets in the queue when the subsequent packets arrive.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more of the aforementioned and other deficiencies experienced in conventional approaches to managing shared resources in a networked environment. In particular, various embodiments provide improvements in the management of shared resources (e.g., CPUs) while at least some of the resources are processing incoming packets, in order to reduce overhead (i.e., in terms of interrupts) and increase the overall efficiency in network-packet processing. For instance, some embodiments may utilize a delay to postpone a CPU from entering an idle state (i.e., where the CPU is not being scheduled for any network packet-related task) when an incoming packet may be anticipated for processing by the CPU. In some embodiments, the resources can be shared by peers (e.g., virtual machines) in a multi-tenant environment. The resources, in some embodiments, can be shared by applications, threads, or processes in a general operating system, etc.

In various embodiments, the shared resources are non-dedicated resources (i.e., not dedicated to a particular task such as packet processing) that perform a variety of tasks for a number of peers, or virtual machines. In some instances, the shared resources may process incoming packets from one or more virtual machines. Multiple CPUs, CPU cores, CPU threads, or other such processing components can be involved in processing the network packets to improve throughput (e.g., packets per second performance) and the overall network performance. In some embodiments, the processing components process each incoming packet in a pipeline stage of several packet-processing pipeline stages. In order to process an incoming packet, one or more processors may be scheduled from an idle state (or low-power state, sleep state, or any other states) to process the packet in a non-dedicated system where the packet-processing resources (e.g., CPUs, CPU cores, CPU threads) are shared, as opposed to being dedicated or always being on the lookout for network packets.

Due at least in part to the observation that network packets typically come in batches, an arrival or transmission of a packet is a good indication that more packets may be coming down the pipeline shortly. Some embodiments utilize a delay to keep a processor scheduled for packet-processing after the processor receives and processes a packet, in anticipation of another incoming packet. This prevents the CPU from entering an idle state immediately after processing the first packet but to be quickly interrupted again by packets that may quickly follow the first packet. By reducing the number of interrupts, the CPU resources consumed per packet may be minimized and the latency reduced, thereby leading to increased efficiency in packet-processing (e.g., packet processed per second is increased) and a reduction in the overall overhead cost.

Some embodiments combine the observation that packets come in batches with information about the packets, such as the source of the packets, the time the packets were received, and/or an identifier that keeps track of each packet, to determine whether to postpone the processor from entering an idle state in anticipation of an incoming packet. For instance, in some embodiments, a CPU that finishes processing a packet in a current pipeline stage may determine when the packet was received by the first pipeline stage (e.g., by using a count/timestamp identifier, by subtracting the processing time for the packet from the first pipeline stage to the current pipeline stage from a current time). By comparing the time at first receipt with a global timestamp that keeps track of the time that the last packet was received at one of the upstream pipeline stages (e.g., the first pipeline stage) for processing, the CPU may determine whether there may be more incoming packets that need processing.

While some embodiments enable the processor to use a timestamp to determine whether there may be more incoming packets, some embodiments enable the processor to use a packet count to make the determination. In some embodiments, each packet has a corresponding identifier (e.g., a packet count, a timestamp) that enables one to keep track of the packets. In those embodiments, the CPU that finishes processing a packet in a pipeline stage may use a packet count or timestamp of the packet for comparison with a global packet count keeping track of the count or timestamp of the last packet received by one of the upstream pipeline stages. The CPU of some embodiments may then conclude that there may be more incoming packets if the count or timestamp of the last processed packet is smaller or indicates an earlier time than the global packet count or global timestamp.

Some embodiments do not use an embedded identifier to keep track of each packet. After a processor processes a packet in a particular stage, some embodiments determines whether to enter an idle state by determining whether the first stage in the several pipeline stages has received and/or processed any packets within a period of time that took the packet to be processed from the first pipeline stage to the particular pipeline stage. Some embodiments perform this determination by subtracting the processing time from a current time and then comparing that time to a global timestamp that indicates the time that a last packet was received by the first pipeline stage. Some embodiments may then conclude that there may be more incoming packets if the global timestamp indicates a later time compared to the current time less the processing time.

In some embodiments, packets or other information to be handled and/or processed by a shared resource will be buffered in at least one queue. Each stage of the pipeline may be associated with a queue of packets to be processed by a CPU. Even though the resource might not provide an acknowledgement when the information is handled or processed, the fact that the packet or information is no longer buffered in a given queue can be used to infer that the packet has been processed. Some embodiments may therefore monitor the state of the upstream pipeline stages and/or downstream pipeline stages, such as how many packets are still being processed and/or pending for processing in each stage, by looking at how many packets are pending in each queue. This information can be used to dynamically adjust the behavior of the system, such as to postpone one or more CPUs performing tasks in downstream stages from entering an idle state. While processor is used to describe the mechanism that performs packet processing in this document, one of ordinary skill in the art would recognize that these are actually threads or processes running on processors that process the packets. In many embodiments, a thread or process that is being executed will be strongly associated with a processor core.

Various other applications, functions, and advantages are presented below with respect to the various embodiments. It should be understood that the description and figures provide a number of examples, but the alternatives and variations possible within the scope of the various embodiments are not fully described. Alternatives and variations, however, would be apparent to one of ordinary skill in the art in light of the teachings and suggestions contained herein.

Figure 1:
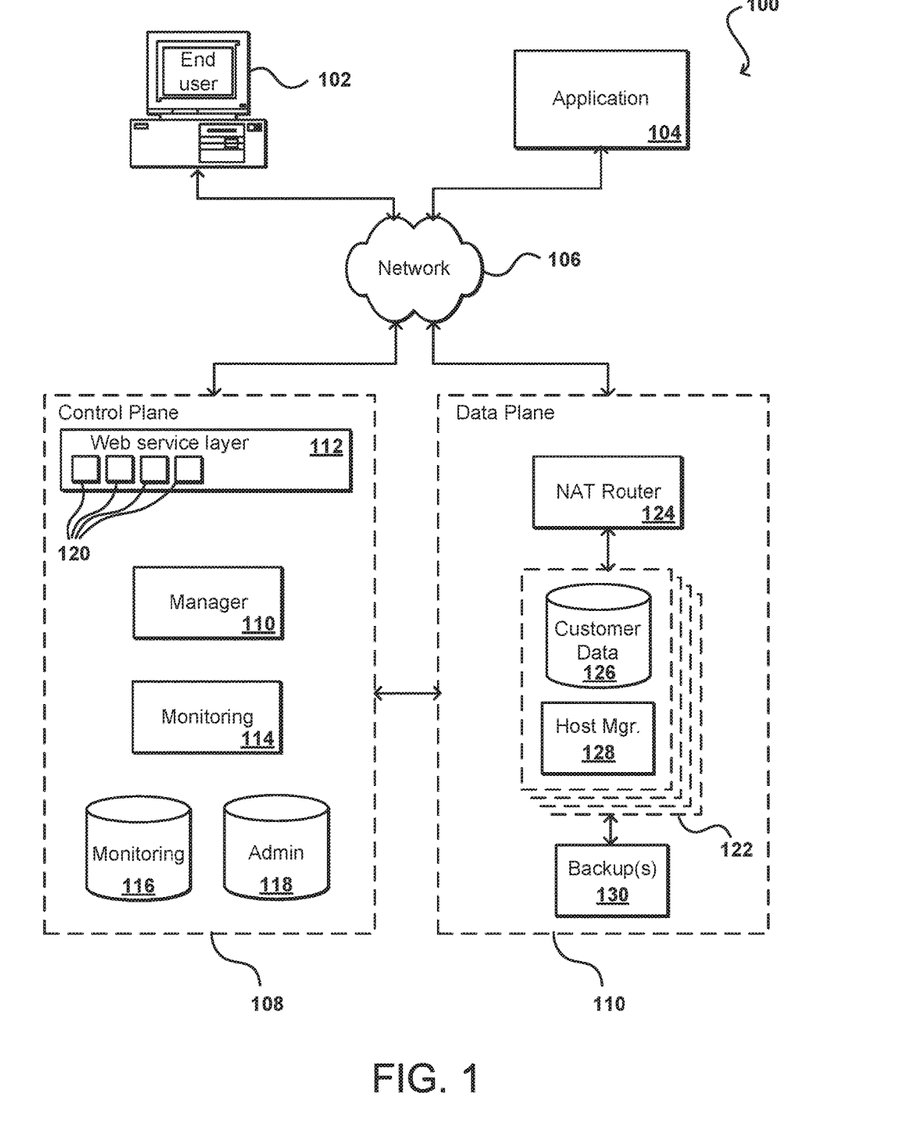
FIG. 1 illustrates an environment for providing access to various resources that can be used in accordance with various embodiments.

FIG. 1 illustrates an example of a network configuration 100, such as may include a shared resource management system, that can be used in accordance with one embodiment. A resource gateway or control plane 108 can be used in some environments to provide and/or manage access to various resources in the data plane 132. In a cloud computing environment, this can correspond to a cloud manager 110 or similar system that manages access to the various resources in the cloud, and enables users and applications to access shared and/or dedicated resources 122, while allowing customers, administrators, or other authorized users to allocate resources to various users, clients, or applications and ensure adherence to those allocations. Such functionality enables a user to perform tasks such as storing, processing, and querying relational data sets in a cloud without worry about latency degradation or other such issues due to other users sharing the resource. Such functionality also enables guest users to obtain access to resources to perform any appropriate functionality, such as to render and/or serve streaming media or perform any of a number of other such operations. While this example is discussed with respect to the Internet, Web services, and Internet-based technology, it should be understood that aspects of the various embodiments can be used with any appropriate resources or services available or offered over a network in an electronic environment. Further, while various examples are presented with respect to shared access to disk, data storage, hosts, and peripheral devices, it should be understood that any appropriate resource can be used within the scope of the various embodiments for any appropriate purpose, and any appropriate parameter can be monitored and used to adjust access or usage of such a resource by any or all of the respective users.

In this example, a computing device 102 for an end user is shown to be able to make calls through a network 106 to a control plane 108 (or other such access layer) to perform a task such as to obtain access to a specified resource or resource type. While an end user computing device and application are used for purposes of explanation, it should be understood that any appropriate user, application, service, device, component, or resource can access the interface(s) and components of the connection component and data environment as appropriate in the various embodiments. Further, while certain components are grouped into a data "plane," it should be understood that this can refer to an actual or virtual separation of at least some resources (e.g., hardware and/or software) used to provide the respective functionality. Further, the control plane can be considered to be part of the data plane in certain embodiments. While a single control plane is shown in this embodiment, there can be multiple instances of control or access management components or services in other embodiments. A control plane can include any appropriate combination of hardware and/or software, such as at least one server configured with computer-executable instructions.

In one embodiment, the control plane includes a set of application programming interfaces (APIs) 120 or other such interfaces that allow a user or customer to make requests for access to various resources. The APIs can receive Web service calls or other such requests from across the network 106, which a Web services layer 112 can parse or otherwise analyze to determine the steps or actions needed to act on or process the call. For example, a Web service call might be received that includes a request to establish a connection to a data repository for to execute a query for a user. In this example, the Web services layer can parse the request to determine the type of connection or access needed, the appropriate type(s) of resource needed, or other such aspects. Once access is established, a resource is allocated, etc., a user can communicate directly with the resource to perform certain tasks relating to that resource, such as data storage or processing. The user can use direct interfaces or APIs to communicate with the data instances, hosts, or other resources once access is established, but uses the control plane component(s) to obtain the access.

The control plane can include one or more resource allocation managers 110, each responsible for tasks such as validating the user or client associated with the request and obtaining or allocating access to the appropriate resource(s). Such a system can handle various types of request and establish various types of connection. Such a system also can handle requests for various types of resources, such as specific graphic processors or other types of hardware or hardware functionality, and can provide access to the appropriate resource(s). Components of the data plane, or the resource layer of the cloud, can perform the necessary tasks to provide the resource. For access to a data instance, for example, this can include tasks such as provisioning a data store instance, allocating a volume of off-instance persistent storage, attaching the persistent storage volume to the data store instance, and allocating and attaching an IP address (derived from DNS mappings) or other address, port, interface, or identifier which the customer can use to access or otherwise connect to the data instance. For tasks such as obtaining processing of an instruction using a particular type of hardware, for example, the components of the data plane, in conjunction with the control plane, can perform actions such as provisioning a device for a user and providing shared and/or dedicated access to the resource for a period of time at a particular level of access to the resource. In this example, a user can be provided with the IP address and a port address to be used to access a resource. A user then can access the resource directly using the IP address and port, without having to access or go through the control plane 108.

The control plane 108 in this embodiment also includes at least one monitoring component 114. When a data instance or other resource is allocated, created, or otherwise made available in the data plane, information for the resource can be written to a data store accessible to the control plane, such as a monitoring data store 116. It should be understood that the monitoring data store can be a separate data store or a portion of another data store. A monitoring component 114 can access the information in the monitoring data store 116 to determine information such as the past usage of resources by various users, a current number or type of threads or resources being allocated to a user, and other such usage information. A monitoring component also can call into components of the data environment to determine information such as the number of active connections for a given user in the data environment and aspects about the usage of each connection. A monitoring component can constantly monitor the usage of each resource by a user, client, etc., having an allocation provided through the connection manager. A monitoring component also can access information stored in an administrative ("Admin") 118 or similar data store 116, which can store information such as the general allocation granted to a user, throttling or limiting information for a user, resource permissions for a user, or any other such information that can be specified and/or updated by an administrator or other such user.

In an example where users request connections to various data instances, each instance 122 in the data environment can include at least one data store 126 and a host manager component 128 for the machine providing access to the data store. A host manager in one embodiment is an application or software agent executing on an instance and/or application server, such as a Tomcat or Java application server, programmed to manage tasks such as software deployment and data store operations, as well as monitoring a state of the data store and/or the respective instance. A host manager can be responsible for managing and/or performing tasks such as setting up the instances for a new repository, including setting up logical volumes and file systems, installing database binaries and seeds, and starting or stopping the repository. A host manager can monitor the health of the data store, monitoring the data store for error conditions such as I/O errors or data storage errors, and can restart the data store if necessary. A host manager can also perform and/or manage the installation of software patches and upgrades for the data store and/or operating system. A host manager also can collect relevant metrics, such as may relate to CPU, memory, and I/O usage.

The resource manager 110 can communicate periodically with each host manager 128 for which a connection has been established, or to an administration server or other component of the resource environment, to determine status information such as load, usage, capacity, etc.

As discussed, once a resource is provisioned and a user is provided with an IP address derived from DNS mappings or other address or location, the user can communicate "directly" with components or resources of the data plane 132 through the network using a Java Database Connectivity (JDBC) or other such protocol to directly interact with that resource 122. In various embodiments, as discussed, the data plane takes the form of (or at least includes or is part of) a computing cloud environment, or a set of Web services and resources that provides data storage and access across a "cloud" or dynamic network of hardware and/or software components. An IP address derived from DNS mappings is beneficial in such a dynamic cloud environment, as instance or availability failures, for example, can be masked by programmatically remapping the IP address to any appropriate replacement instance for a use. A request received from a user 102 or application 104, for example, can be directed to a network address translation (NAT) router 124, or other appropriate component, which can direct the request to the actual resource 122 or host corresponding to the mapped address of the request. Such an approach allows for instances to be dynamically moved, updated, replicated, etc., without requiring the user or application to change the IP address or other address used to access the instance. In some cases, a resource 122 such as a data instance can have at least one backup instance 130 or copy in persistent storage.

In various embodiments, packets or other information to be processed will often come in batches. As a result, one may infer that there may be one or more packets following a packet received by a processor for processing. Some embodiments may therefore postpone the processor from entering an idle state, or another low-power or low-consumption state, immediately after processing a packet and poll the processor for a period of time in the likely event that another packet will be following shortly. Keeping the processor scheduled for a period of time in anticipation of another packet that will likely follow reduces interrupts and, in turn, the total overhead cost.

Figure 2:
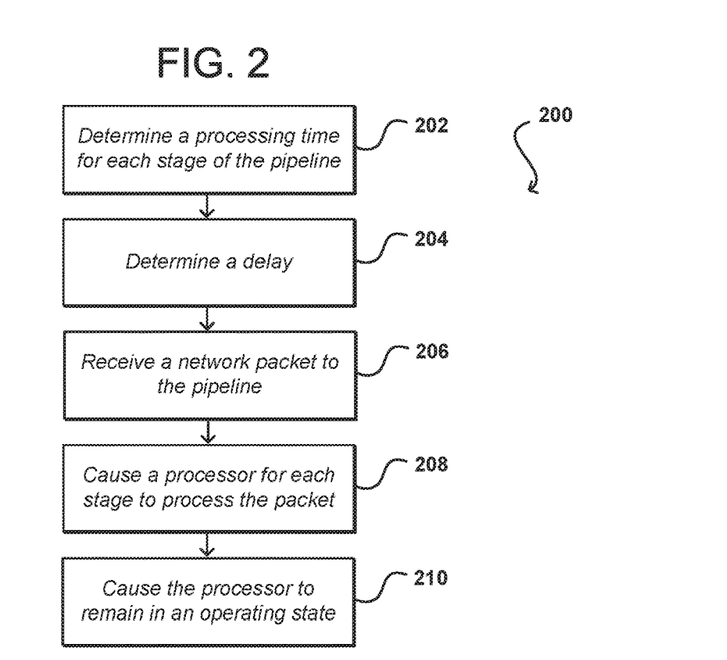
FIG. 2 conceptually illustrates a process of some embodiments for utilizing a delay to keep a processor from entering an idle state immediately after processing a packet in anticipation of a following packet for processing.

FIG. 2 conceptually illustrates a process 200 of some embodiments for utilizing a delay to keep a processor from entering an idle state immediately after processing a packet in anticipation of a following packet for processing. It should be understood, however, that for any process described herein there can be additional, fewer, or alternative steps performed in similar or alternative orders, or in parallel, unless otherwise stated, within the scope of the various embodiments. The process 200 will be described by reference to FIG. 3, which illustrates an example 300 of the performance characteristics of a number of CPUs processing incoming packets.

In FIG. 2, a processing time for each stage of a network packet-processing pipeline is determined 202. As described, a network packet-processing pipeline includes several ordered stages in accordance to some embodiments. In some embodiments, the pipeline stages may include reception, forwarding stack, virtualization backend, VM network stack, and application. Different embodiments may include different types and different number of stages. The pipeline stages in FIG. 3 run in parallel (e.g., on the available processors). Some embodiments determine the processing time for each stage in order to determine an amount of time to delay a CPU from entering an idle state after the CPU finishes processing a packet in a particular stage, which is further described below.

Figure 3:
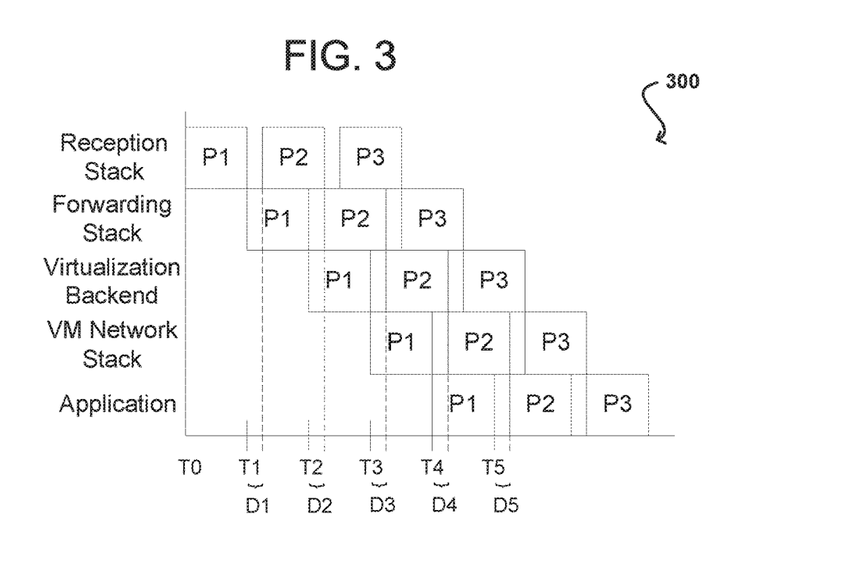
FIG. 3 illustrates an example of the performance characteristics of a number of CPUs processing incoming packets.

In some embodiments, the service time or amount of time needed for processing a packet in each of the stages may not be the same. For example, while processing a packet in the first stage of the pipeline (e.g., reception stage) by a processor may take one microsecond, processing the packet in the second stage of the pipeline (e.g., forwarding stack) may take more than five microseconds. In FIG. 3, the time difference between $T_0$ and $T_1$ may be the same as the time difference between $T_1$ and $T_2$, while in some embodiments, the time to process a packet in the different stages may not be the same (i.e., $T_2-T_1>T_1-T_0$).

Returning to FIG. 2, a delay is determined 204 in some embodiments. A delay indicates an amount of time to poll a processor or keep a processor scheduled for network packet-related tasks. As mentioned above, after a processor finishes processing a packet, instead of allowing the processor to enter an idle state (i.e., where the CPU is not being scheduled for any network packet-related tasks, but may be scheduled for some other unrelated tasks, threads, or processes), some embodiments poll the processor for a duration of time in anticipation of an incoming packet. Some embodiments enable the processor to further enter a low-power state or a sleep state after the processor has been in an idle state beyond a period of time, where the low-power state and the sleep state have a relatively higher latency (i.e., requires more time to "wake the processor up") when the processor is being rescheduled for packet-processing tasks.

In some embodiments, the delay is a fixed delay. For example, some embodiments poll each processor processing a packet in each pipeline stage for a period of one microsecond in anticipation of another incoming packet. In some embodiments, a processor for each pipeline stage spins for a different amount of time. Some embodiments determine the delay or the amount of time in which to poll a processor based on the amount of time needed to process the packet in a pipeline stage and the amount of time needed to process the packet in a previous pipeline stage. For instance, a CPU that finished processing a packet in the second pipeline stage (e.g., the forwarding stack) may "stay awake" for two microseconds if it took three microseconds to process the packet in this stage and five microseconds to process the packet in the previous stage (e.g., reception stage).

As shown in FIG. 3, a subsequent packet is not received immediately after a packet has been processed in each stage, but within a short duration of time (e.g., D1, D2, etc.). As described above, some embodiments keep the processors from entering an idle state immediately after processing a packet if another packet is anticipated shortly. In this instance, after a first packet P1 has been processed by a processor (e.g., CPU1) in the reception stage, the processor (e.g., CPU1) spins for D1 microseconds in anticipation of a second packet P2. After the first packet P1 has been processed by a processor (e.g., CPU2) in the forwarding stack, the processor (e.g., CPU2) delays from entering an idle state for D2 microseconds in anticipation of the second packet P2. The processor (e.g., CPU1, CPU2) of some embodiments may similarly delay from entering an idle state after processing the second packet P2, the third packet P3, so on and so forth, until the last packet in the batch is processed. Although some cost is incurred in polling the processors after each processing of a packet, the cost is minimal compared to the interrupt cost that may accumulate every time the processors receive the next packet in the batch after the processor(s) have entered an idle state, a low-power state, or a sleep state. Moreover, the duration of the delay or the length of the poll loop in general should not be too long in order to avoid starving the other tasks of the CPUs.

As described, some embodiments use a fixed delay (e.g., D1=D2=D3) for each processor (e.g., CPU1, CPU2, CPU3) after the processor finishes processing the packet (e.g., P1) in a pipeline stage regardless of the amount of time it took to process the packet in that particular pipeline stage. In this example, each processor (e.g., CPU1-CPU5) that finishes processing P1 in each of the pipeline stages is delayed from entering an idle state for a fixed amount of time (i.e., D1=D2=D3=D4=D5) after processing a packet.

Some embodiments, as described above, may cause the CPUs to spin for a different amount of time, depending on the time it takes to process a packet in a current stage and in a previous stage. As described, the delay for a particular stage may be determined by taking a difference between the longest poll that led up to the particular pipeline and the processing time for the particular pipeline. In the instance where processing a packet (e.g., P1 by CPU1) in a first stage may take 1 microsecond, processing the packet in the second stage may take 5 microseconds, and processing the packet in the third stage may take 3 microseconds, D1 may be 0 microseconds and D2 may be 2 microseconds (i.e., 5−3=2).

Returning to FIG. 2, a network packet is received to the pipeline 206 for processing in the various stages of the pipeline. Some embodiments receive the network packet from a network interface card (NIC) for processing in a first pipeline stage of the pipeline that has multiple ordered stages. As shown in FIG. 3, a first packet P1 is received to the first stage, the reception stack, of the network packet-processing pipeline. In one embodiment where multiple VMs share a NIC, the system may keep track of the VMs from which the packets are received by keeping track of the identity of the VM sending the packet. As a result, the packet-processing pipeline setup may serve and process packets for multiple VMs in a shared resource environment (e.g., by operating the stages in parallel and having several CPUs processing packets at the same time in each stage).

In some embodiments, the processor for each stage is caused to process the network packet 208. While any processor may be chosen to perform the tasks for each stage, some embodiments may choose the same processor for performing the tasks of a particular pipeline stage. For instance, CPU1 may process an incoming packet in the reception stage. As CPU1 finishes processing the packet, CPU1 may be chosen again to process the next incoming packet P2 in the reception stage. In some embodiments, different CPUs may be chosen to process the packets for a same stage.

The processor is caused to remain "in an operating state" (i.e., scheduled for packet-processing related tasks) or caused to spin for a duration of time corresponding to the determined delay 210. In this example, a second packet received to the pipeline is able to be processed while the processor is in the operative state during the time of the delay. Instead of allowing the processor to enter an idle state after finishing the processing of a packet, the processor remains operative for an amount of time in anticipation of another packet. So long as the anticipated packet arrives for processing within the duration of the determined delay, the processor may process the packet without incurring interrupt cost (i.e., cost of entering an idle mode but to be "woken up" again in order to process the packet).

Figure 4:
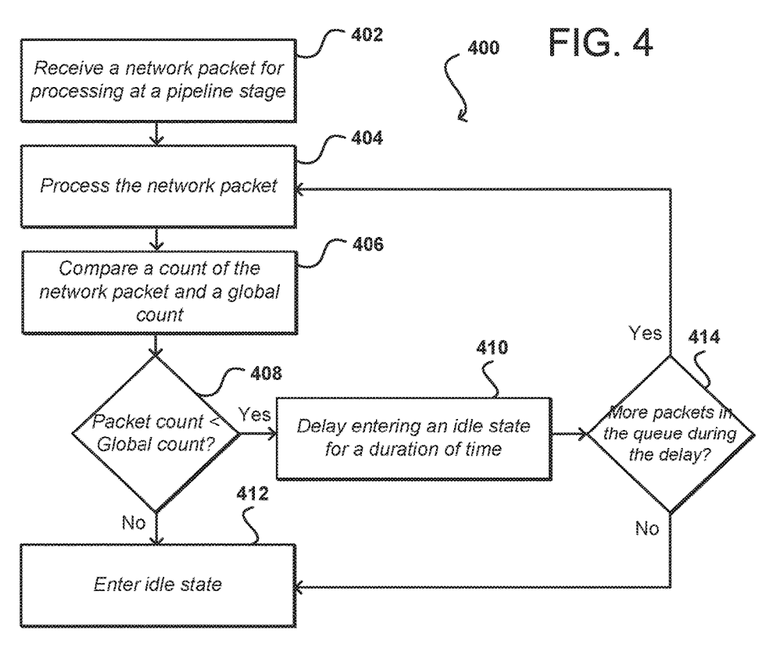
FIG. 4 conceptually illustrates a process of some embodiments for determining whether to allow a processor to enter an idle state after the processor finishes processing a packet.

FIG. 4 conceptually illustrates a process 400 of some embodiments for determining whether to allow a processor to enter an idle state after the processor finishes processing a packet. The process 400 will be described by reference to FIGS. 5(a) and 5(b), which illustrate examples of a processor making a determination as to whether to enter an idle state using a count system. Some embodiments keep a processor from entering an idle state by comparing a count of the most recently processed packet in a current stage with a global count in an upstream pipeline stage. The processor of some embodiments may determine that a global count in an upstream pipeline stage, which indicates a count of a packet most recently processed in that particular upstream pipeline stage, is greater than the count of the most recently processed packet in the current stage. Some embodiments may therefore conclude that there are likely more incoming packets as an upstream pipeline stage has received and/or processed a newer packet than the packet that was just processed by the current stage.

While some embodiments may utilize a count system to determine whether to delay a processor from entering an idle state (e.g., by assigning packets received earlier with a higher order count (e.g., 1) and packets received later with a lower order count (e.g., 2) and comparing the counts to determine whether the packet last processed by a processor was the last packet in a batch), some embodiments may utilize a timestamp system to perform this determination. Similar to the count system, the timestamp system may use identifiers that correspond to each packet. In some embodiments, the identifiers are embedded in the packets and the corresponding identifier for each packet increases monotonically for later received packets.

Figure 5A:
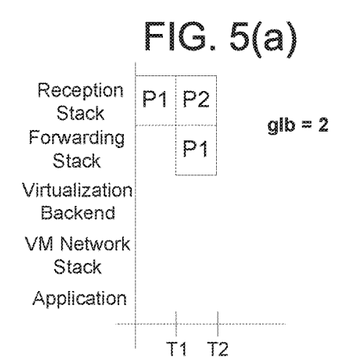
FIGS. 5(a) and 5(b) illustrate examples of a processor making a determination as to whether to enter an idle state using a count system in accordance with various embodiments.
Figure 5B:
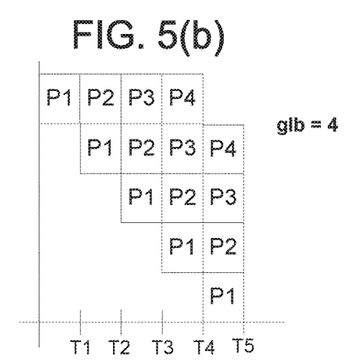

Some embodiments determine whether to utilize a delay by comparing a count of the most recently processed packet with the total number of packets that have been received by an upstream pipeline stage (e.g., the first stage of the packet-processing pipeline). In FIG. 4, a network packet is received for processing at a particular stage of a packet-processing pipeline 402. As mentioned, a packet-processing pipeline has several ordered stages where one or more processors may perform a number of tasks in order to process the network packet. A network packet may be received from a VM for processing by the shared resources. A virtualized server serving more than one VM may keep track of packets from a given VM by using the identity of the VM (e.g., as stored information in each of the packets). In FIGS. 5(a) and 5(b), the pipeline stages may include reception stack, forwarding stack, virtualization backend, VM network stack, and application. Different embodiments may include different types, number, and order of stages.

Upon receiving a network packet, a processor (e.g., CPU1) processes the received network packet in the pipeline stage 404 (e.g., the first pipeline stage or the reception stack). While the stage is active, some embodiments set a global count (e.g., a machine-wide global variable) that keeps track of the last network packet that entered the pipeline stage for processing (e.g., a count of the last network packet or a timestamp of when the last network packet entered). Some embodiments have one global count for a packet-processing pipeline that keeps track of the last network packet that entered the first pipeline stage (or received by the NIC). In some embodiments, each pipeline stage includes a global count that keeps track of the last network packet that entered that particular pipeline stage for processing. Each pipeline stage may have multiple timestamps and/or counters in some embodiments. In some embodiments, each of the multiple timestamps and/or counters correspond to a different packet pipeline (e.g., each VM having a corresponding packet pipeline).

Each network packet may include a corresponding packet count (e.g., by storing count information in a field of a data structure such as a socket buffer (SKB) that corresponds to each network packet) in some embodiments. In some embodiments, the packet count for each packet indicates the order that each packet was received (e.g., the later received packets have a higher count, similarly, the later received packets have a later timestamp). For instance, a packet with (count=2) may indicate that the packet is the second packet in the series of incoming packets. This enables the processor to determine whether a newer packet has entered an upstream pipeline stage relative to the packet that had just been processed by the processor.

FIG. 5(a) illustrates that at time $T_2$, there are already two packets P1 and P2 (e.g., each with a count of 1 and 2, respectively) being processed by CPU2 and CPU1, respectively. At time $T_2$, the global count is 2. After processing the network packet in each pipeline stage, a count of the network packet is compared with a global count of an upstream pipeline stage (e.g., the first pipeline stage) 406. In some embodiments, the CPU compares a count of the packet that it had just finished processing (e.g., by looking at the packet count field in the SKB corresponding to the packet) with the global count of an upstream pipeline stage in order to determine whether there may be more packets coming from upstream stages. The CPU of some embodiments may postpone entering an idle state in the event that additional packets may have entered the pipeline and may eventually need processing by the CPU. In FIG. 5(a), upon processing P1 in the second pipeline stage (i.e., the forwarding stack), CPU2 determines whether to delay sleep by comparing the count of P1 (i.e., $count_{P1}=1$) with the global count (i.e., global count=2).

Returning to FIG. 4, a determination is made as to whether the count of the network packet is less than the global count of an upstream pipeline stage 408 in some embodiments. If the count of the network packet is less than the global count (or if the count of the network packet is more than a threshold count less than the global count), the processor spins for a duration of time 410. Since the global count of a particular upstream stage indicates the number of packets that have been received by the particular upstream pipeline stage, if the current packet count is lower than the global count, then it is likely that there will be more packets following the most recently processed packet. In some embodiments, if the count of the network packet is less than the global count (or if the count of the network packet is more than a threshold count less than the global count), the CPU processing the network packet postpones entering an idle state in anticipation of another packet. In FIG. 5(*a*), CPU2 determines the count of packet P1 that CPU2 had just finished processing at time T2. Since the count of P1 is 1, and the global count is 2 (i.e., P1 and P2 have entered the first pipeline stage), CPU2 delays entering an idle state in anticipation of an incoming packet P2. Enabling a processor processing packets in downstream stages to determine that there may be incoming packets and "stay awake" for the incoming packets minimizes the number of interrupts and the overhead cost.

Returning to FIG. 4, some embodiments determine whether there are one or more packets in the queue for the current pipeline stage during the delay 414. In some embodiments, one or more packets may be received in the queue of the current pipeline stage for the processor to process. If there are more packets in the queue during the delay for the duration of time, some embodiments return to 404 and process the network packet. If there are no packets in the queue or received by the queue during the delay for the duration of time, some embodiments then enter an idle state 412.

Returning to 408, if the packet count is not less than a global count of an upstream pipeline stage, the processor enters an idle state 412. In some embodiments, the processor enters an idle state if the packet count is not beyond a threshold (e.g., two counts) less than the global count. For instance, if the packet count is one and the global count is two, the packet count is not beyond the threshold less than the global count and therefore the processor enters the idle state. The global count for each pipeline stage is updated every time a network packet is received by each of the pipeline stages (or by the NIC). Since the global count of a pipeline stage keeps track of the last packet that entered the pipeline stage, some embodiments determine that the most recently processed packet may be the last packet within the batch if the count for the most recently processed packet is the same as the global count in an upstream pipeline stage. Upon determining that the last packet in the batch has been processed by the processor, some embodiments determine that the processor may enter an idle state. In FIG. 5(*b*), at time T5 when CPU2 has finished processing P4, CPU2 compares the packet P4's count with the global count of an upstream pipeline stage (i.e., the first pipeline stage). Since the global count and the packet count is the same, indicating that the most currently processed packet is the last packet received in the batch, the processor CPU2 determines that it may enter an idle state.

Figure 6:
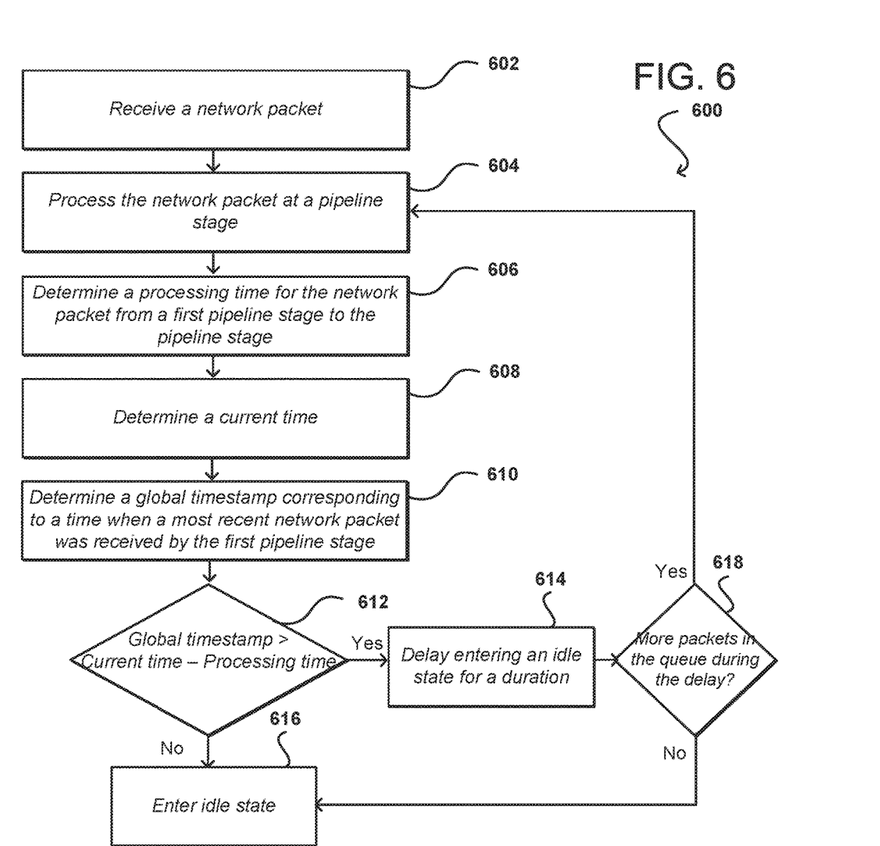
FIG. 6 conceptually illustrates a process of some embodiments for determining whether to keep a processor from entering an idle state after the processor finishes processing a packet.
Figure 7A:
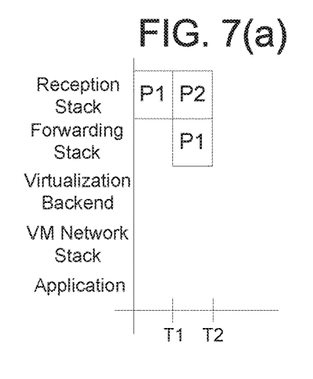
FIGS. 7(a) and 7(b) illustrate examples of a processor making a determination as to whether to enter an idle state using a timestamp system in accordance with various embodiments.
Figure 7B:
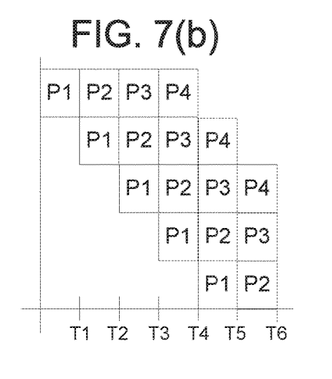

Some embodiments enable the processor to determine whether to postpone entering an idle state without requiring each packet to keep track of its packet identifier (i.e., without requiring each packet to have a packet count field or timestamp field embedded in the SKB corresponding to the packet). To perform this determination, some embodiments compare an initial entry time of a packet with a global timestamp that represents a time that a last packet was received and/or processed by the first pipeline stage (e.g., the reception stack). FIG. 6 conceptually illustrates a process 600 of some embodiments for determining whether to keep a processor from entering an idle state after the processor finishes processing a packet. The process 600 will be described by reference to FIGS. 7(*a*) and 7(*b*), which illustrate examples of a processor making a determination as to whether to enter an idle state using a non-embedded timestamp system.

In the example shown in FIG. 6, a network packet is received 602. In some embodiments, the network packet is received to a NIC, which updates a global timestamp indicating the last time the NIC received a packet. Some embodiments update the global timestamp upon being received and/or processed by a processor in the first pipeline stage (e.g., the reception stage). In some embodiments, the global timestamp is a variable that keeps track of the time that the last packet was received by the NIC or the time that the last packet was being processed in the first pipeline stage. The global timestamp is updated in some embodiments every time a new packet is received by the first pipeline stage (e.g., the reception stage). By being able to compare a time that a packet being processed by a processor was received by the NIC (or by a processor for processing in the first pipeline stage) with the global timestamp that indicates the last time a packet was received by the NIC (or in the first pipeline stage), some embodiments may determine whether to keep the processor from entering an idle state in anticipation of an incoming packet. Further, some embodiments may use a threshold in determining whether to enable the processor to enter an idle state. For instance, the processor may be kept from entering an idle state if the initial entry time for the packet indicates a time only one microsecond prior to the global timestamp since the packet might have been discarded during regular network stack processing.

Then, the network packet is processed at a pipeline stage 604. In the illustration shown in FIG. 7(*a*), the network packet P1 is being processed (e.g., by CPU2) in the second pipeline stage, the forwarding stack, while the network packet P2 is being processed (e.g., by CPU1) in the first pipeline stage, the reception stack. After the network packet is processed, some embodiments determine whether it is likely that another packet will be following soon (e.g., will arrive within the next five microseconds) by determining whether the reception stack has processed any packets within a threshold duration (e.g., five microseconds). The threshold duration is determined by the amount of time it took the packet to be processed from the first stage of the pipeline to the current stage.

Some embodiments determine whether the reception stack has processed any packets within the threshold duration by comparing a time that the packet being processed was received by the first pipeline stage (or an initial entry time) against a global count that indicates the last time a packet was received by the first pipeline stage. In some embodiments, the processor may determine the initial entry time of the network packet by determining a current time and subtracting the amount of time it took to process this packet from the first pipeline stage until the current stage. If the global count indicates a time later than the time that the packet being processed was received by the first pipeline stage, then there are likely one or more packets following the packet. In this example, a processing time for the network packet from a first pipeline stage to the pipeline stage is determined 606. A current time is determined 608 in some embodiments. By determining a processing time from a first stage to a current stage and by determining a current time, some embodiments may estimate a time that the network packet processed by the current stage was received at the reception stack.

A global timestamp corresponding to a time when a most recent network packet was received by the first pipeline stage is determined 610. Some embodiments then compare the global time stamp with a time when the packet was received in the first pipeline stage 612. If the global timestamp indicates a time later than a current time less a processing time, then there are likely more incoming packets. The processor of some embodiments delays entering an idle state for a duration of time 614. Some embodiments delay the processor from entering an idle state when the global timestamp indicates a time beyond a threshold duration later than the current time less the processing time. For instance, if the current time less the processing time (i.e., an initial entry time) is T1 and the global timestamp indicates a time that is later than or greater than T1+x (i.e., the threshold duration of time), then some embodiments may keep the processor from entering the idle state.

FIG. 7(a) illustrates that as CPU2 finishes processing P1, CPU2 determines whether the initial entry time of the network packet P1 is earlier than the updated global timestamp. In some embodiments, the initial entry time of the network packet P1 is determined by subtracting the time it took to process P1 from the first pipeline stage to the current pipeline stage from the current time. In some embodiments as described above, the network packet includes the initial entry time. In this example, upon finishing processing P1, CPU2 determines P1's initial entry time by subtracting a processing time of the first two stages (e.g., the reception stack and the forwarding stack) from a current time, which is T0. CPU2 compares the initial entry time T0 to the global timestamp, which is T1. In this example, T1 is at a later time than T0, indicating that the processor in the first pipeline stage had received a more recent packet (i.e., P2). Upon determining that the initial entry time is earlier than the global timestamp, the processor CPU2 delays entering an idle state by an amount of time in anticipation of an incoming packet from an upstream stage.

Returning to FIG. 6, some embodiments determine whether there are one or more packets in the queue for the current pipeline stage during the delay 618. In some embodiments, one or more packets may be received in the queue of the current pipeline stage for the processor to process. If there are more packets in the queue during the delay for the duration of time, some embodiments return to 604 and process the network packet. If there are no packets in the queue or received by the queue during the delay for the duration of time, some embodiments then enter an idle state 616.

Returning to 612, if the global timestamp indicates a time that is not later than a current time less a processing time, then there are likely no more incoming packets. The processor of some embodiments enters an idle state 616. In some embodiments, the global timestamp is updated every time an initial stage of the plurality of pipeline stages receives a new network packet. When the global timestamp indicates a time that is not later than the current time less the processing time, then the processor of some embodiments may determine that the most recently processed packet is the last packet in a batch of packets. Some embodiments enable the processor to delay entering an idle state for a period of time. As mentioned above, the period of time in which to keep the processor from entering an idle state may be a fixed duration preconfigured by a developer or a duration that is determined based upon the processing time for the packet in the different pipeline stages.

FIG. 7(b) illustrates that at T6, CPU3 finishes processing packet P4 in the third pipeline stage. After CPU3 finishes processing P4, CPU3 determines whether the reception stack has processed any packets within the duration of a processing time for processing P4 from the first pipeline stage to the current stage (i.e., the third pipeline stage). In this example, the initial entry time of P4 is a current time subtracting the processing time. CPU3 compares the initial entry time T3 with the global timestamp T3 and determines or concludes that the most currently processed packet P4 is the last packet in the batch. Since no further packets have been received by the first pipeline stage since P4 was received at T3, CPU3 enters an idle state after making this determination. In some instances, one or more packets may have been dropped along the way, thereby causing the processor to determine that there may be incoming packets even when there are no additional incoming packets for processing. In some embodiments, the packet count/timestamp corresponding to the packet in the pipeline stage may be retroactively adjusted to reflect the packet drop. Further, some embodiments keep the processor from entering an idle state when the packet count/timestamp indicates a count/timestamp beyond a threshold count/period of time. For instance, the processor may not enter an idle state in some embodiments if comparing the packet count and a global count indicates that the packet count is only one count less than the global count (i.e., supposedly indicating that there may be another packet coming after the current packet).

Some embodiments determine a fixed duration to postpone the processor from entering an idle state. In some embodiments, the fixed duration may be pre-determined by a developer. Some embodiments enable the processor to determine a specific duration in which to postpone the processor from entering an idle state. As described above, the duration or the delay may be calculated by subtracting the time it took the processor to process the most currently processed packet from the time it took a processor to process the same packet in a previous pipeline stage in some embodiments.

Figure 8:
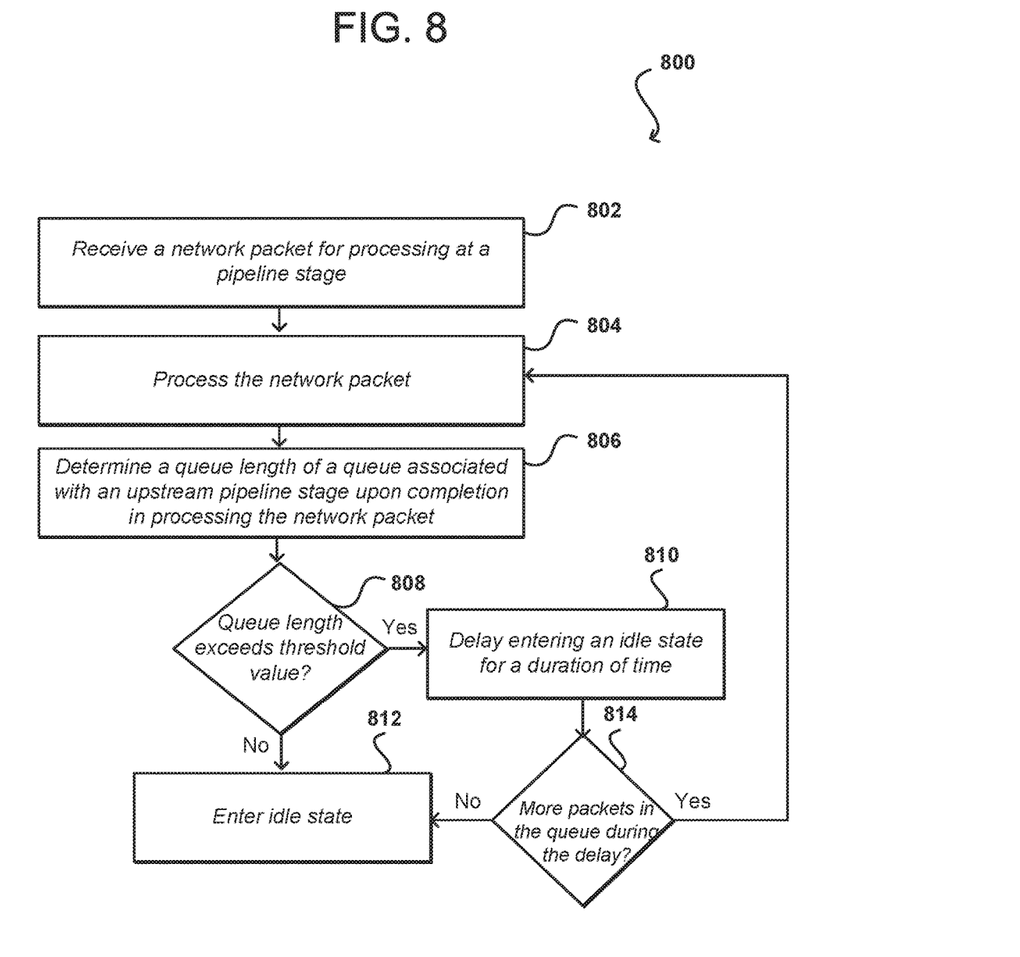
FIG. 8 conceptually illustrates a process of some embodiments for determining whether to keep a processor from entering an idle state immediately after processing a packet by determining a queue length of upstream pipeline stages.

FIG. 8 conceptually illustrates a process 800 of some embodiments for determining whether to keep a processor from entering an idle state immediately after processing a packet by determining a queue length of upstream pipeline stages. As mentioned, a packet arriving into the system is processed by a subset of pipeline stages prior to departure. In some embodiments, each pipeline stage is associated with a queue where packets are queued until a processor becomes available to service the packet. The service times of the stages are not equal so queues may be placed between each stage of the pipeline. For instance, while it may take the reception stage only one microsecond to process a packet, the forwarding stack may need five microseconds to process the packet. As a result, some pipeline stages may have a longer queue, while other pipeline stages that are quick to process packets may have a shorter queue, if anything in its associated queue. After being processed by a stage, the packet is queued either for processing at the next processing stage or for transmission at an outgoing link when the packet has been processed by all the required stages.

In this example, a network packet is received for processing at a pipeline stage in several pipeline stages 802. Each pipeline stage in the several pipeline stages is associated with a queue. In some embodiments, an available processor processes the network packet 804. A queue length of a particular queue associated with an upstream pipeline stage is determined 806 after processing the network packet in this pipeline stage. After a processor in each of the pipeline stages finishes processing a packet, the processor determines whether to enter an idle state. In one embodiment the processor that finishes processing a packet in a pipeline stage determines the queue length of the upstream pipeline stages.

Upon determining the queue length of one or more upstream pipeline stages, a determination is made as to whether the queue length exceeds a threshold value 808. If the queue length does not exceeds a threshold value, the processor enters an idle state 812. If the queue length exceeds a threshold value, the processor spins for a duration of time 810. In some embodiments, the CPU performing tasks in a downstream stage may determine that there will be incoming packets if the queue length is one or more (threshold value being zero). Then, the CPU in some embodiments spins for a duration of time in anticipation of incoming packets. In some embodiments, the CPU does not spin beyond a threshold period of time (e.g., twenty microseconds, one hundred microseconds).

Some embodiments determine whether there are one or more packets in the queue for the current pipeline stage during the delay 814. In some embodiments, one or more packets may be received in the queue of the current pipeline stage for the processor to process. If there are more packets in the queue during the delay for the duration of time, some embodiments return to 804 and process the network packet. If there are no packets in the queue or received by the queue during the delay for the duration of time, some embodiments then enter an idle state 812.

As mentioned above, some embodiments may use the shared resources to process incoming packets for multiple VMs at the same time. In such embodiments, separate global variables (e.g., global timestamps, global counts) for each of the multiple VMs may be maintained. Some embodiments may set a global variable for each VM and distinguish the incoming packets using the MAC address included in the packets. In some embodiments, the global variable for a particular VM updates upon receiving an incoming packet in the first pipeline stage and determining the particular VM from which the packet was received. By maintaining separate global variables, multiple processors performing packet processing for multiple VMs may separately perform a determination as to whether to delay entering an idle state in various embodiments.

In some embodiments, the downstream pipeline stages may not be able to determine or access a global count/timestamp of a previous pipeline stage or may not be able to determine a queue length of an upstream pipeline stage. For instance, the VM network stack may not be able access a global count or determine a queue length of the virtualization backend stack. Some embodiments use a heuristics-based approach to perform adjustments (e.g., utilizes a delay) to the stages that can freely communicate with its upstream pipeline stages in order for those downstream stages to process packets appropriately. Further, some embodiments extend existing API implementations so that the information can be communicated between the different pipeline stages. For example, while the VM network stack may not be permitted to communicate with or freely access the variables in the reception stack, some embodiments may manually extend the API between the virtualization backend stack and the VM network stack to provide this information.

While various embodiments described herein perform a determination for a processor as to whether to enter an idle state (e.g., after the processor finishes processing a packet in a pipeline stage), some embodiments "yield" the processor, or voluntarily relinquish the processor, before a determination is made. When the processor is "yielded", other processes or threads that need processing by the processor may use the processor to perform those tasks. In some embodiments, the processor may be scheduled again for packet-processing tasks if there are no other non-packet processing related tasks that require attention. Some embodiments may then proceed to determine whether to enter an idle state or delay entering an idle state using the various methodologies as described above.

Some embodiments may determine that there will likely not be more incoming packets in the near future when the processor has been yielded for some time (indicating that the processor was processing non-packet processing related tasks), which may take an amount of time up to the order of milliseconds, and that after the processor returns there are no incoming packets accumulated in the queue of a pipeline stage. In this case, some embodiments may then determine that the processor may enter an idle state. This implementation may be useful in some embodiments as the processing resources have been better utilized (e.g., by processing the non-packet processing related tasks).

Figure 9:
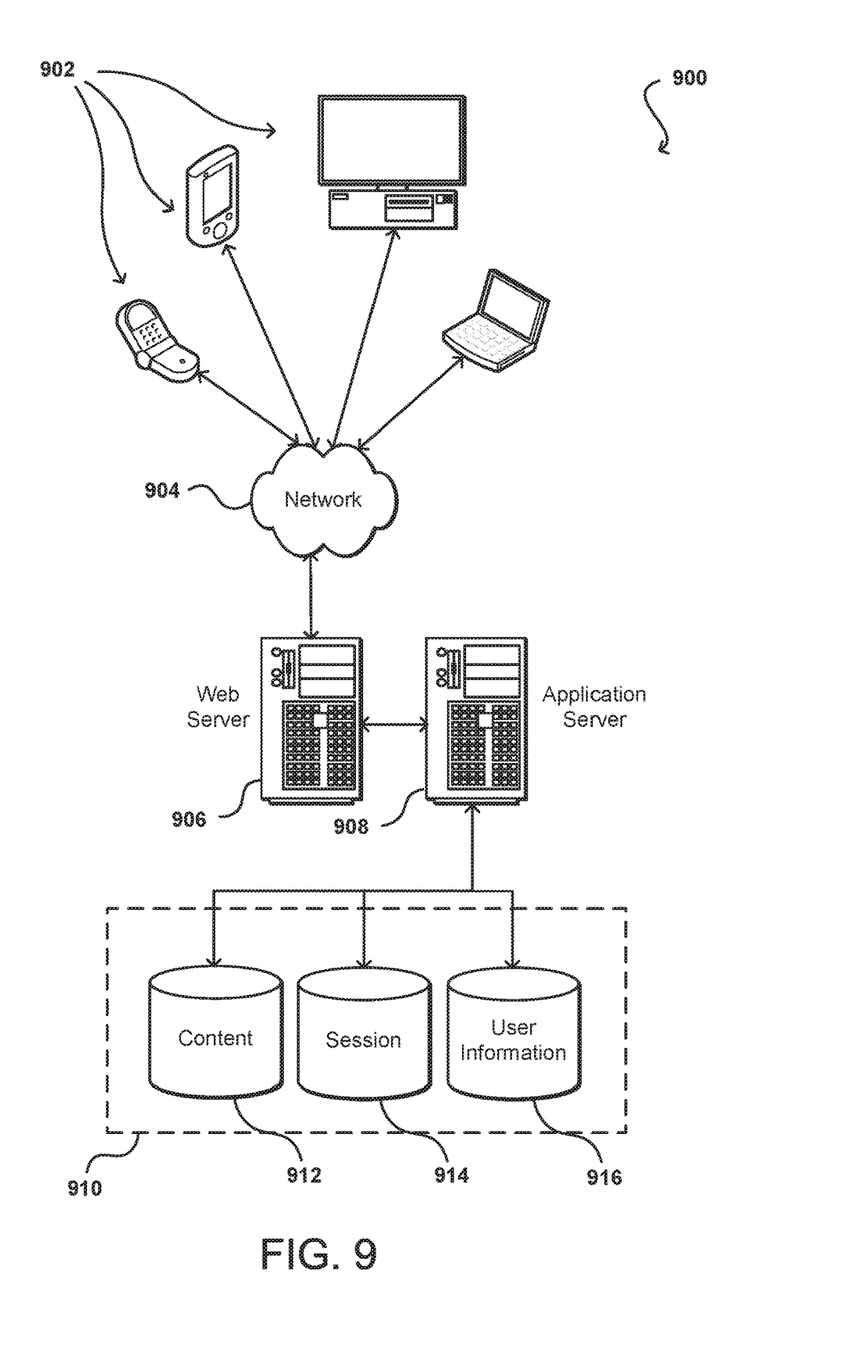
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk®. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method, comprising:
    determining, by a computer system, a first processing time for a first stage of a pipeline and a second processing time for a second stage of the pipeline, the first stage and the second stage included in a plurality of stages of the pipeline;
    determining a first delay value based at least in part on the first processing time, the first delay value being associated with the first stage of the pipeline;
    obtaining a first network packet at the pipeline, the first network packet being obtained from a particular source within a first time that includes at least the first processing time and the second processing time;
    causing a processor to process the first network packet at the first stage of the pipeline while the processor is in a processing state;
    causing the processor to remain in the processing state after processing the first network packet at the first stage of the pipeline for at least the first delay value;
    causing the processor to process the first network packet at the second stage of the pipeline while the processor is in the processing state;
    determining a second delay value based at least in part on the second processing time, the second delay value being associated with the second stage of the pipeline, the first delay value being different from the second delay value, and the second delay value being calculated based at least in part on which of polling the processor at the first stage of the pipeline, the first processing time, or the second processing time is a greatest value;
    causing the processor to remain in the processing state after processing the first network packet for at least the second delay value; and
    obtaining a second network packet at the pipeline, the second network packet being obtained after the first network packet is obtained, and the second network packet being able to be processed while the processor is in the processing state.

2. The method of claim 1, wherein the first network packet and second network packet are part of a burst of packets.

3. The method of claim 1, wherein causing the processor to remain in the processing state includes polling the processor for network packet-related tasks.

4. The method of claim 1, wherein the first delay value is one microsecond based at least in part on an anticipation of receiving the second network packet.

5. The method of claim 1, wherein the first delay value is determined by calculating a difference between a beginning of the first processing time and the beginning of the second processing time.

6. The method of claim 5, wherein the second processing time is two microseconds.

7. The method of claim 1 further comprising causing one or more additional processors in one or more downstream stages of the pipeline to spin for a second time associated with the first delay value and the second delay value.

8. A non-transitory computer-readable storage medium storing computer-executable instructions that, when executed by a processor, cause the processor to perform operations, comprising:
    determining a first processing time for a first stage of a pipeline and a second processing time for a second stage of the pipeline, the first stage and the second stage of the pipeline included in a plurality of stages of the pipeline;
    determining a first delay value based at least in part on the first processing time, the first delay value being associated with the first stage of the pipeline;
    obtaining a first network packet at the pipeline, the first network packet being obtained from a source within a first time that includes at least the first processing time and the second processing time;
    causing the processor to process the first network packet at the first stage of the pipeline while the processor is in a processing state;
    causing the processor to remain in the processing state after processing the first network packet at the first stage of the pipeline for at least the first delay value;
    causing the processor to process the first network packet at the second stage of the pipeline while the processor is in the processing state;
    determining a second delay value based at least in part on the second processing time, the second delay value being associated with the second stage of the pipeline, the first delay value being different from the second delay value, and the second delay value being calculated based at least in part on which of polling the processor at the first stage of the pipeline, the first processing time, or the second processing time is a greatest value;

causing the processor to remain in the processing state after processing the first network packet for at least the second delay value; and obtaining a second network packet at the pipeline, the second network packet being able to be processed while the processor is in the processing state.

9. The non-transitory computer-readable storage medium of claim wherein the first network packet is transmitted to a virtual machine.

10. The non-transitory computer-readable storage medium of claim 8, wherein the plurality of stages comprise reception, forwarding stack, virtualization backend, virtual machine (VM) network stack, or application.

11. The non-transitory computer-readable storage medium of claim 10, wherein the plurality of stages is ordered such that reception is the first stage and application is a last stage in the plurality of stages.

12. The non-transitory computer-readable storage medium of claim 8, wherein causing the processor to remain in the processing state includes polling the processor for network packet-related tasks.

13. The non-transitory computer-readable storage medium of claim 8, wherein the processor is prevented from entering an idle state for at least a sum of the first processing time and the second processing time.

14. A system comprising:
a processor; and
a memory device including instructions that, when executed by the processor, cause the processor to:
determine a first processing time for a first stage of a pipeline and a second processing time for a second stage of the pipeline, the first stage and the second stage included in a plurality of stages of the pipeline;
determine a first delay value based at least in part on the first processing time, the first delay value being associated with the first stage of the pipeline;
obtain a first network packet at the pipeline;
process the first network packet at the first stage of the pipeline while the processor is in a processing state;
remain in the processing state after processing the first network packet at the first stage of the pipeline for at least the first delay value;
process the first network packet at the second stage of the pipeline while the processor is in the processing state;
determine a second delay value based at least in part on the second processing time, the second delay value being associated with the second stage of the pipeline, the first delay value being different from the second delay value, and the second delay value being calculated based at least in part on which of polling the processor at the first stage of the pipeline, the first processing time, or the second processing time is a greatest value; and
remain in the processing state after processing the first network packet for at least the second delay, a second packet being received to be processed while the processor is in the processing state.

15. The system of claim 14, further comprising a plurality of non-dedicated resources capable of maintaining a plurality of virtual machines and capable of performing a variety of tasks in addition to packet-processing.

16. The system of claim 14, wherein at least one delay value for a particular stage of the pipeline is a difference between the first processing time and a processing time of a different stage.

17. The system of claim 14, wherein the pipeline is one of a plurality of pipelines, the pipeline associated with a first virtual machine of a plurality of virtual machines that have one or more corresponding pipelines of the plurality of pipelines.

18. The system of claim 14, wherein the first network packet is obtained from a burst of packets.

19. The system of claim 14, wherein the first network packet is a virtual machine and wherein the virtual machine that sent the first network packet is identified while the system is processing the first network packet.

20. The system of claim 14, wherein the pipeline corresponds to one of a plurality of virtual machines.

* * * * *

UNITED STATES PATENT AND TRADEMARK OFFICE
CERTIFICATE OF CORRECTION

PATENT NO. : 10,169,060 B1
APPLICATION NO. : 15/211958
DATED : January 1, 2019
INVENTOR(S) : Pradeep Vincent and David D. Becker Page 1 of 1

It is certified that error appears in the above-identified patent and that said Letters Patent is hereby corrected as shown below:

In the Claims

Column 21, Line 8, Claim 9:
Delete: "of claim wherein the first network packet is transmitted to a"
Insert: --of claim 8 wherein the first network packet is transmitted to a--

Signed and Sealed this
Twenty-fifth Day of June, 2019

Andrei Iancu
*Director of the United States Patent and Trademark Office*